F. H. BELDING.
ATTACHMENT FOR CHECKING CORN WITHOUT A WIRE.
APPLICATION FILED DEC. 7, 1916.

1,233,167.

Patented July 10, 1917.

Witness
Harry B. Rook.

By

Inventor
Floyd H. Belding
H. S. Field
Attorney

UNITED STATES PATENT OFFICE.

FLOYD H. BELDING, OF LENOX, IOWA, ASSIGNOR OF ONE-HALF TO WALTER BOLTING-HOUSE, OF LENOX, IOWA.

ATTACHMENT FOR CHECKING CORN WITHOUT A WIRE.

1,233,167.  Specification of Letters Patent.  Patented July 10, 1917.

Application filed December 7, 1916. Serial No. 135,640.

*To all whom it may concern:*

Be it known that I, FLOYD H. BELDING, a citizen of the United States, residing at Lenox, in the county of Taylor, State of Iowa, have invented a new and useful Attachment for Checking Corn Without a Wire; and I do hereby declare the following to be a full, clear, and exact description of the invention, such as will enable others skilled in the art to which it appertains to make and use the same.

The present invention relates to a check row corn planter, and has for its object to provide a device of this character which embodies novel features of construction whereby the corn can be dropped at the desired intervals without the necessity of stretching a wire across the field.

Further objects of the invention are to provide a check row corn planter which is comparatively simple and inexpensive in its construction, which can be easily thrown into and out of operation, which can be adjusted to deposit the corn at larger or smaller intervals, depending upon the character of the soil and the conditions of the country, and which enables the corn to be planted with sufficient accuracy without the annoyance and inconvenience which are always incident to stretching a wire across the field.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Corresponding and like parts are referred to in the following description and indicated in all the views of the drawings by the same reference characters.

Figure 1:
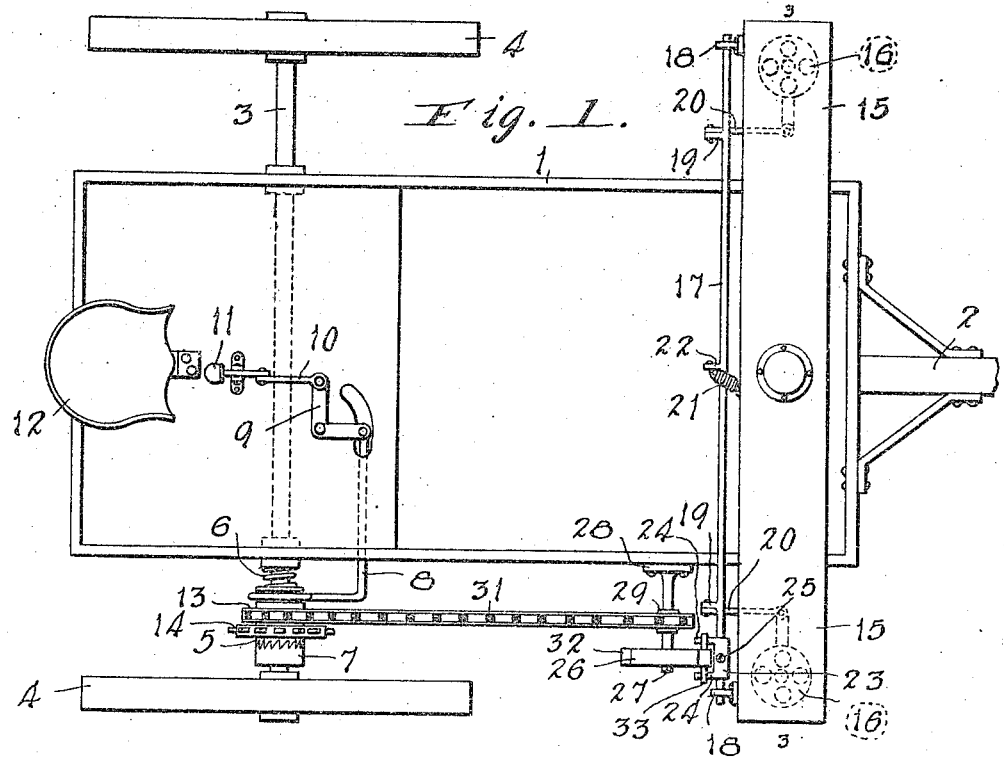
Figure 1 is a top plan view of a corn planter constructed in accordance with the invention.
Figure 2:
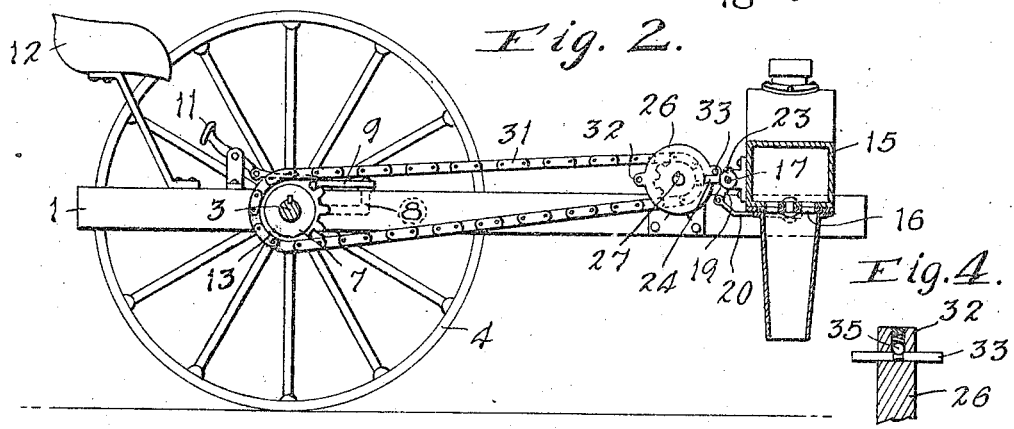
Fig. 2 is a longitudinal sectional view through the same.

Referring to the drawings, the numeral 1 designates the main supporting frame of the corn planter, said frame being connected at its forward end with a draft tongue 2, and being supported by an axle 3 which has the wheels 4 rigidly applied to the ends thereof. A sleeve 5 is loose upon the axle 3 and slidable longitudinally thereon, said sleeve being normally held by a spring 6 in a yielding engagement with a clutch collar 7 which is rigid with the axle. A shifting arm 8 is operatively connected with the sleeve 5 for sliding the same against the action of the spring 6 and disengaging it from the clutch collar 7, thereby unlocking the sleeve from the axle so that the axle can rotate independently thereof. This shifting arm 8 has the end thereof connected to a bell crank lever 9 which is in turn connected by a link 10 to a foot pedal 11 arranged in front of the seat 12. With this construction it will be obvious that an operator sitting upon the seat 12 can at any time disengage the sleeve 5 from the clutch collar 7 by pressing forwardly upon the pedal 11. The sliding sleeve 5 carries a pair of sprocket wheels 13 and 14 which are of different sizes.

Seed hoppers 15 are mounted upon opposite sides of the main frame 1, said hoppers being provided with conventional seed dropping valves, as indicated at 16. A transverse rock shaft 17 extends transversely across the forward end of the machine at the rear of the seed hoppers 15, the ends of the shaft being journaled within suitable bearings 18 which project rearwardly from the hoppers. Opposite end portions of the rock shaft are provided with arms 19 which are operatively connected by links 20 to the respective seed dropping valves 16, so that the said seed dropping valves are operated each time the rock shaft is rotated. A spring 21 engages an intermediate arm 22 on the rock shaft and normally rotates the same into proper position for closing the seed dropping valves.

A sleeve 23 is fitted upon one end of the rock shaft 17, said sleeve being provided with a pair of laterally projecting trip fingers 24, and being adapted to be locked in an adjusted position by a set screw 25. These trip fingers 24 straddle the periphery of a disk 26 which is mounted upon a short shaft 27, said shaft 27 being carried by a bracket 28 fitted upon the main frame 1. A sprocket wheel 29 is rigid with the disk 26, and a chain 31 is provided for connecting either of the rear sprocket wheels 13 or 14 to the forward sprocket wheel 29, the difference in the sizes of the sprocket wheels enabling the disk 26 to be rotated at different speeds as the planter is advanced, thereby admitting of the seed being dropped at larger or smaller intervals, as desired.

Figure 4:
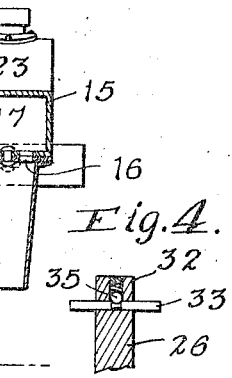
Fig. 4 is a detail view of the latch means for holding the trip pins of the disk in position.
Figure 3:
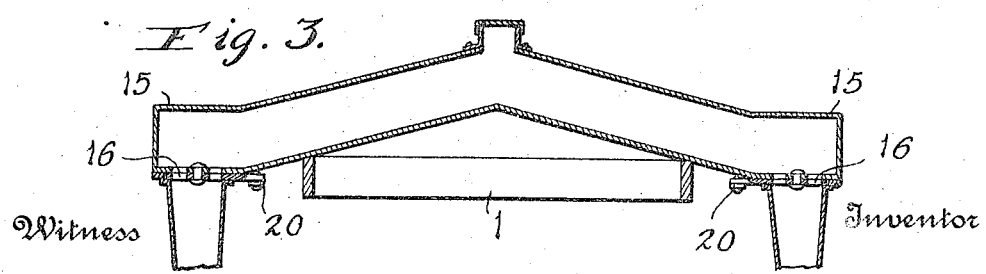
Fig. 3 is a transverse sectional view through the hopper.

The periphery of the disk 26 is provided with perforated ears 32 through which trip pins 33 may be inserted, said trip pins projecting laterally upon opposite sides of the disk so as to engage the trip fingers 24 of the rock shaft 17 and actuate the latter at intervals as the machine is advanced across a field. One or more of the trip pins 33 may be inserted in position, depending upon the intervals of space which it is desired between the corn. Any suitable means may be provided for holding the trip pins 33 in position, such as the spring latch 35 shown by Fig. 4.

The sleeve 5 is normally locked with the axle 3 so that the chain and sprocket is driven when the machine is advanced. However, when it is desired to throw the planting mechanism out of operation, as when moving the planter to the field, or making a turn at the end of a field, the operator has merely to press forwardly upon the foot pedal 11 to slide the sleeve 5 away from the clutch member 7 and disengage it therefrom. After the planter has been properly started the foot pedal 11 is released and the planting mechanism thrown into operation. The disk 26 is driven by the chain and sprocket connection as the machine is advanced, the speed of rotation of the disk relative to the movements of the planter being adapted to be varied by placing the chain 31 in engagement with selected sprocket wheels. As the disk 26 rotates the trip pins 33 successively engage the trip fingers 24 of the rock shaft 17 so as to actuate the seed dropping valves at the desired intervals of time.

The spring latch 35 may be in the form of a ball which is fitted in an opening and yieldably pressed inwardly by a spring 36, the outer end of the spring engaging a plug 37 which is threaded in the mouth of the opening so as to close the same. This admits of the trip pins 33 being forcibly inserted in position or removed therefrom, and they are held against accidental displacement by the spring latch members.

Having thus described the invention, what I claim as new and desire to secure by Letters Patent, is:—

1. In a check row corn planter, the combination with a wheeled frame including an axle having wheels rigidly applied thereto, and a seed dropping mechanism, of a disk journaled upon the frame and formed with a series of perforated ears which project from the periphery thereof, removable trip pins inserted through the perforations of selected ones of the ears, the ends of the trip pins projecting laterally upon opposite sides of the disk, a driving connection between the disk and the axle, a rock shaft arranged parallel to the axle and operatively connected to the seed dropping mechanism, a sleeve loose upon the rock shaft, means for locking the sleeve in an adjusted position, and a pair of trip fingers rigid with the sleeve and projecting laterally from the opposite ends thereof, said trip fingers straddling the disk so as to be successively engaged by the laterally projecting ends of the before mentioned trip fingers.

2. In a check row planter, the combination with a wheeled frame including an axle having wheels rigidly applied thereto, and a seed dropping mechanism, of a disk journaled upon the frame and provided at its periphery with a series of perforated ears, removable trip pins inserted through the perforations of selected ones of the ears and arranged laterally with the ends thereof projecting upon opposite sides of the disk, spring latch means for holding the trip fingers removably in position within the perforated ears, a rock shaft operatively connected to the seed dropping mechanism, and trip fingers rigid with the rock shaft and projecting into the path of the before mentioned trip pins.

In testimony whereof I have signed my name to this specification in the presence of two subscribing witnesses.

FLOYD H. BELDING.

Witnesses:
JAMES R. LOCKE,
MINNIE E. BELDING.

Copies of this patent may be obtained for five cents each, by addressing the "Commissioner of Patents, Washington, D. C."